(12) United States Patent
Ikeda (10) Patent No.: US 9,931,774 B2
(45) Date of Patent: Apr. 3, 2018

(54) INJECTING MACHINE FOR TWO DIFFERENT LIQUID MATERIALS HAVING MIXING MECHANISM SUPPORTED ENTIRELY BY INJECTION CYLINDER

(71) Applicant: NISSEI PLASTIC INDUSTRIAL CO., LTD., Nagano (JP)

(72) Inventor: Toru Ikeda, Nagano (JP)

(73) Assignee: NISSEI PLASTIC INDUSTRIES CO., LTD. (JP)

( * ) Notice: Subject to any disclaimer, the term of this patent is extended or adjusted under 35 U.S.C. 154(b) by 796 days.

(21) Appl. No.: 14/153,920

(22) Filed: Jan. 13, 2014

(65) Prior Publication Data

US 2014/0198600 A1 Jul. 17, 2014

(30) Foreign Application Priority Data

Jan. 16, 2013 (JP) ................................. 2013-005608

(51) Int. Cl.
B29C 45/18 (2006.01)
B29C 45/54 (2006.01)

(52) U.S. Cl.
CPC ........ B29C 45/1866 (2013.01); B29C 45/542 (2013.01); B29C 45/54 (2013.01); B29C 2045/547 (2013.01)

(58) Field of Classification Search
CPC ...... B01F 5/0615; B01F 7/248; B01F 13/103; B01F 13/1027; B01F 15/0278;
(Continued)

(56) References Cited

U.S. PATENT DOCUMENTS 2,359,840 A * 10/1944 Goessling ............... B29C 45/23
188/153 R
3,372,434 A * 3/1968 Hendry ................... B29C 45/54
366/76.1
(Continued)

FOREIGN PATENT DOCUMENTS

DE 19703628 A1 * 10/1997 ............. B29C 45/54
DE 10230331 B3 * 4/2004 ........... B29C 44/421
(Continued)

OTHER PUBLICATIONS

Notification of Reasons for Refusal dated May 12, 2015 issued in Japanese Patent Appln. No. P2013-005608 together with partial English translation thereof.

*Primary Examiner* — Charles E Cooley
(74) *Attorney, Agent, or Firm* — Bruce L. Adams; Klintworth & Rozenblat IP LLP (57) ABSTRACT

An injecting machine for two different liquid material includes an injection cylinder having a nozzle disposed on a distal end thereof. A plunger is reciprocally received in the injection cylinder for undergoing reciprocating movement between an advanced position and a retracted position, with the plunger injecting a liquid mixture of the two different liquid materials as the plunger moves to the advanced position. A moving mechanism causes the plunger to reciprocate between the advanced position and the retracted position. A mixing mechanism is disposed on the injection cylinder for mixing the two different liquid materials together to feed the liquid mixture into the injection cylinder. A support plate supports a proximal portion of the injection cylinder. The mixing mechanism is supported in its entirety by the injection cylinder.

7 Claims, 7 Drawing Sheets

(58) Field of Classification Search
CPC .... B01F 15/0279; B01F 7/246; B01F 5/0671; B01F 2005/0637; Y10T 137/87652; B29C 45/54; B29C 2045/548
USPC .................................................. 366/76.3–76.4
See application file for complete search history.

(56) References Cited

U.S. PATENT DOCUMENTS

| | | | | |
|---|---|---|---|---|
| 3,481,001 | A * | 12/1969 | Stillhard | B29C 45/48 |
| 4,473,299 | A * | 9/1984 | Guibert | A21C 1/06 366/156.2 |
| 4,983,045 | A * | 1/1991 | Taniguchi | B01F 11/0082 366/117 |
| 5,123,833 | A * | 6/1992 | Parker | B29C 45/586 264/328.4 |
| 5,665,282 | A * | 9/1997 | Nakamura | B29C 45/5008 264/328.1 |
| 5,773,042 | A * | 6/1998 | Amano | B29C 45/54 425/207 |
| 5,861,182 | A * | 1/1999 | Takizawa | B29C 45/54 425/557 |
| 5,925,295 | A * | 7/1999 | Nakamura | B29C 45/50 264/328.19 |
| 6,030,203 | A * | 2/2000 | Kuroda | B29C 45/54 366/75 |
| 6,187,229 | B1 * | 2/2001 | Takayama | B29C 45/263 264/1.33 |
| 6,533,447 | B2 * | 3/2003 | Koide | B29C 45/54 366/100 |
| 7,918,662 | B2 * | 4/2011 | Sawa | B29C 45/48 425/205 |
| 8,123,394 | B2 * | 2/2012 | Becht | B01F 3/10 366/138 |
| 9,339,962 | B2 * | 5/2016 | Yokoyama | B29C 45/1775 |
| 2002/0006076 | A1 * | 1/2002 | Koide | B29C 45/54 366/78 |
| 2004/0057332 | A1 * | 3/2004 | Taniguchi | B01F 1/0011 366/118 |
| 2005/0019441 | A1 * | 1/2005 | Seta | B29C 45/54 425/145 |
| 2007/0140045 | A1 * | 6/2007 | Becht | B01F 3/10 366/160.4 |
| 2016/0001474 | A1 * | 1/2016 | Nakatani | B29C 45/54 264/50 |
| 2017/0157822 | A1 * | 6/2017 | Momono | B29B 7/426 |

FOREIGN PATENT DOCUMENTS

| | | | | |
|---|---|---|---|---|
| EP | 909627 | A1 * | 4/1999 | |
| JP | 9295329 | | 11/1997 | |
| JP | 2782419 | B2 * | 7/1998 | B29C 45/52 |
| JP | 2899862 | * | 3/1999 | |
| JP | 2923220 | * | 4/1999 | |
| JP | 2965902 | B2 * | 10/1999 | B29C 45/54 |
| JP | 2000326376 | | 11/2000 | |
| JP | 2000334775 | | 12/2000 | |
| JP | 3554739 | B2 * | 8/2004 | B29C 45/54 |
| JP | 3608856 | B2 * | 1/2005 | B29C 45/0005 |
| JP | 2006334974 | | 12/2006 | |
| JP | 2007076276 | | 3/2007 | |
| WO | WO 0202293 | A1 * | 1/2002 | B29C 45/18 |
| WO | 2009103803 | A1 * | 8/2009 | |

* cited by examiner

INJECTING MACHINE FOR TWO DIFFERENT LIQUID MATERIALS HAVING MIXING MECHANISM SUPPORTED ENTIRELY BY INJECTION CYLINDER

FIELD OF THE INVENTION

The present invention relates to an improvement in an injecting machine for two different liquid resin materials.

BACKGROUND OF THE INVENTION

An injecting machine for receiving and mixing two different liquid resin materials (hereinafter referred to, for brevity, as "liquid materials") together to inject a predetermined measured amount of a mixture of the two different liquid materials is known as disclosed in Japanese Patent Application Laid-open Publication (JP-A) No. 2007-76276.

Figure 8:
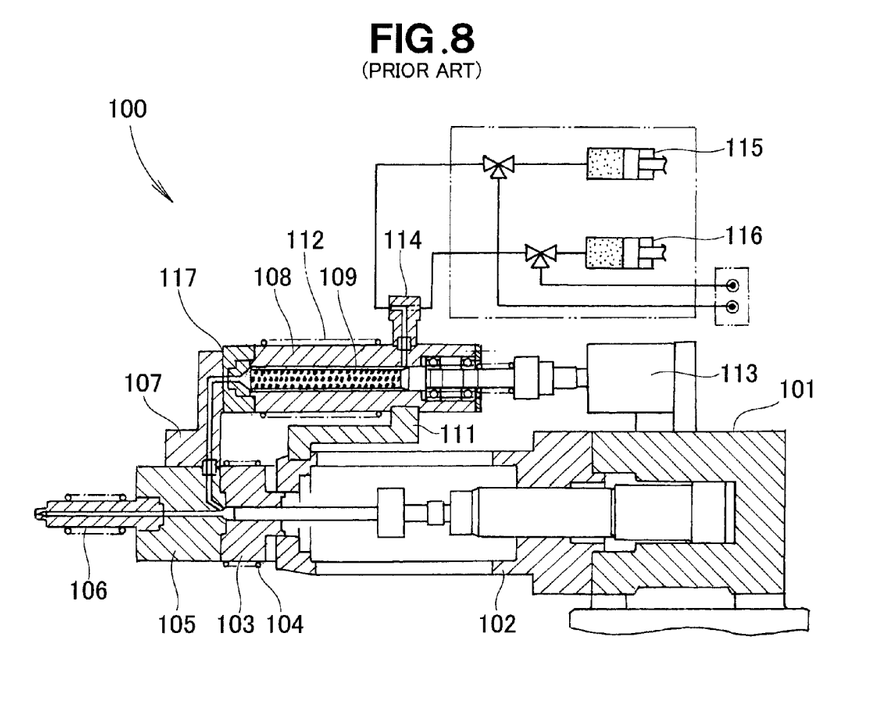
FIG. 8 is a schematic view of a prior art injecting machine for two different liquid materials.

FIG. 8 hereof shows a general configuration of an injecting machine disclosed in JP 2007-76276A. The disclosed injecting machine 100 includes a cylinder 101 for driving a plunger, a bracket 102 extending forwardly from a front end of the cylinder 101, an injection cylinder 103 supported by a front end of the bracket 102, a first heater 104 associated with the injection cylinder 103, a nozzle adapter 105 fixed to a front end face of the injection cylinder 103, and a nozzle 106 attached to a front end of the nozzle adapter 105. The injecting machine 100 further includes a connecting member 107 supported by the nozzle adapter 107 to extend vertically upwards, a mixing cylinder 108 connected to an upper part of the connecting member 107, a mixing shaft 109 rotatably received in the mixing cylinder 108, a sub-bracket 111 extending from the bracket 102 and supporting the mixing cylinder 108, a second heater 112 associated with the mixing cylinder 108, a drive unit 113 mounted on an upper surface of the cylinder 101 for rotating the mixing shaft 109, a mixer 104 mounted on an upper surface of a proximal end portion of the mixing cylinder 108, and first and second cylinders 115 and 116 connected to the mixer 114.

With the injecting machine 100 thus arranged, a first cylinder 115 forces a first liquid material out while the second cylinder 116 forces a second liquid material out. The first liquid material and the second liquid material are combined together in the mixer 114 to flow into the mixing cylinder 108. The first and second liquid materials are sufficiently mixed together by rotation of the mixing shaft 109 in the mixing cylinder 108 to provide a liquid mixture of the first and second liquid materials. The liquid mixture is introduced through the connecting member 107 into the injection cylinder 103.

During that time, the liquid mixture tends to solidify as the temperature goes down. To avoid this, the first heater 104 heats the injection cylinder 103, and the second heater 112 heat the mixing cylinder 108.

The mixing cylinder 108 is supported by the bracket 102 via the sub-bracket 111, while the connecting member 107 is supported by the nozzle adapter 105. With this arrangement, due to change in ambient temperature and heating by the first and second heaters 104, 112, heat expansion and contraction occurs, tending to vary the distance between the sub-bracket 111 and the connecting member 107. If the distance increases, it may occurs that the liquid mixture leaks from a mating part of the connecting member 107 and the mixing cylinder 108.

If the connecting member 107 and the mixing cylinder 108 are mechanically connected together so as to avoid leakage of the liquid mixture, the connecting member 107 or the sub-bracket will be damaged due to repeated bending force applied thereto. As for the connecting member 107 and the mixing cylinder 108, a mechanical connection cannot be employed, which will inevitably allow the occurrence of leakage of the liquid mixture from the mating part.

To meet a demand for a high material yield and a clean mixing cylinder and its surroundings, an effective leakage countermeasure is required.

An object of the present invention is to provide an injecting machine for two different liquid materials, which is configured to provide an effective leakage countermeasure.

SUMMARY OF THE INVENTION

According to one aspect of the present invention, there is provided an injecting machine for two different liquid materials, comprising: an injection cylinder having a nozzle disposed on a distal end thereof; a plunger reciprocally received in the injection cylinder for undergoing reciprocating movement between an advanced position and a retracted position, the plunger injecting a liquid mixture of the two different liquid materials as the plunger moves to the advanced position; plunger moving means for causing the plunger to reciprocate between the advanced position and the retracted position; a mixing mechanism disposed on the injection cylinder for mixing the two different liquid materials together to feed the liquid mixture into the injection cylinder; and a support plate supporting a proximal portion of the injection cylinder, wherein the entirety of the mixing mechanism is supported by the injection cylinder.

With this arrangement, because the entirety of the mixing mechanism is supported by the injection cylinder, the mixing mechanism can move together with the injection cylinder even when the distance between the injection cylinder and a neighboring part is caused to vary due to change in temperature. This means that there is no clearance developed in the mixing mechanism and leakage of the liquid mixture does not take place.

In one preferred form of the present invention, the two different liquid materials include a first liquid material and a second liquid material, and the mixing mechanism comprises: a mixing block; a screw rotatably accommodated in the mixing block; a screw rotating mechanism supported on the mixing block for rotating the screw; a first liquid supply passage disposed at a first portion of the mixing block for supplying the first liquid material to a proximal portion of the screw; a second liquid supply passage disposed at a second portion of the mixing block for supplying the second liquid material to the proximal portion of the screw, the second portion being separate from the first portion; a first passage formed in the mixing block for causing the liquid mixture to flow out of a vicinity of a distal end of the screw; a valve casing connected to the mixing block and configured to receive the liquid mixture through the first passage; a valve element movably received in the valve casing and disposed parallel to the screw; and a valve actuator mounted to the valve casing for moving the valve element, wherein the valve casing is fixed to the injection cylinder so that the entirety of the mixing mechanism is supported by the injection cylinder.

Among those components constituting the mixing mechanism, only the valve casing is fixed to the injection cylinder and the other components remain separated from the injection cylinder. Thus, the mixing mechanism is not easily influenced by thermal deformation of the injection cylinder.

In a further preferred form of the invention, the plunger is disposed to extend horizontally, and the screw is disposed to extend vertically. The vertically disposed screw makes the mixing mechanism to have a vertically elongated structure, which requires only a small space for installation and, hence, can be easily mounted on the injection cylinder even when the plane area of the injection cylinder is relatively small.

In a still further preferred form of the present invention, the first passage extends perpendicularly to the plunger. This arrangement makes the mixing mechanism to have a portion projecting in a lateral outward direction from the injection cylinder but a size of the mixing mechanism in a lengthwise direction of the injection cylinder becomes small. Thus, the entire length of the injection cylinder can be reduced.

In another preferred form of the present invention, the first passage extends in parallel to an axis of the plunger. With this arrangement, the injection cylinder is protected from being subjected to a couple of force, which may occur when the first passage extends perpendicularly to the cylinder.

BRIEF DESCRIPTION OF THE DRAWINGS

Certain preferred structural embodiments of the present invention will be described in detail below, by way of example only, with reference to the accompanying drawings, in which like reference numerals designate like parts and in which.

DETAILED DESCRIPTION OF THE PREFERRED EMBODIMENTS

Figure 1:
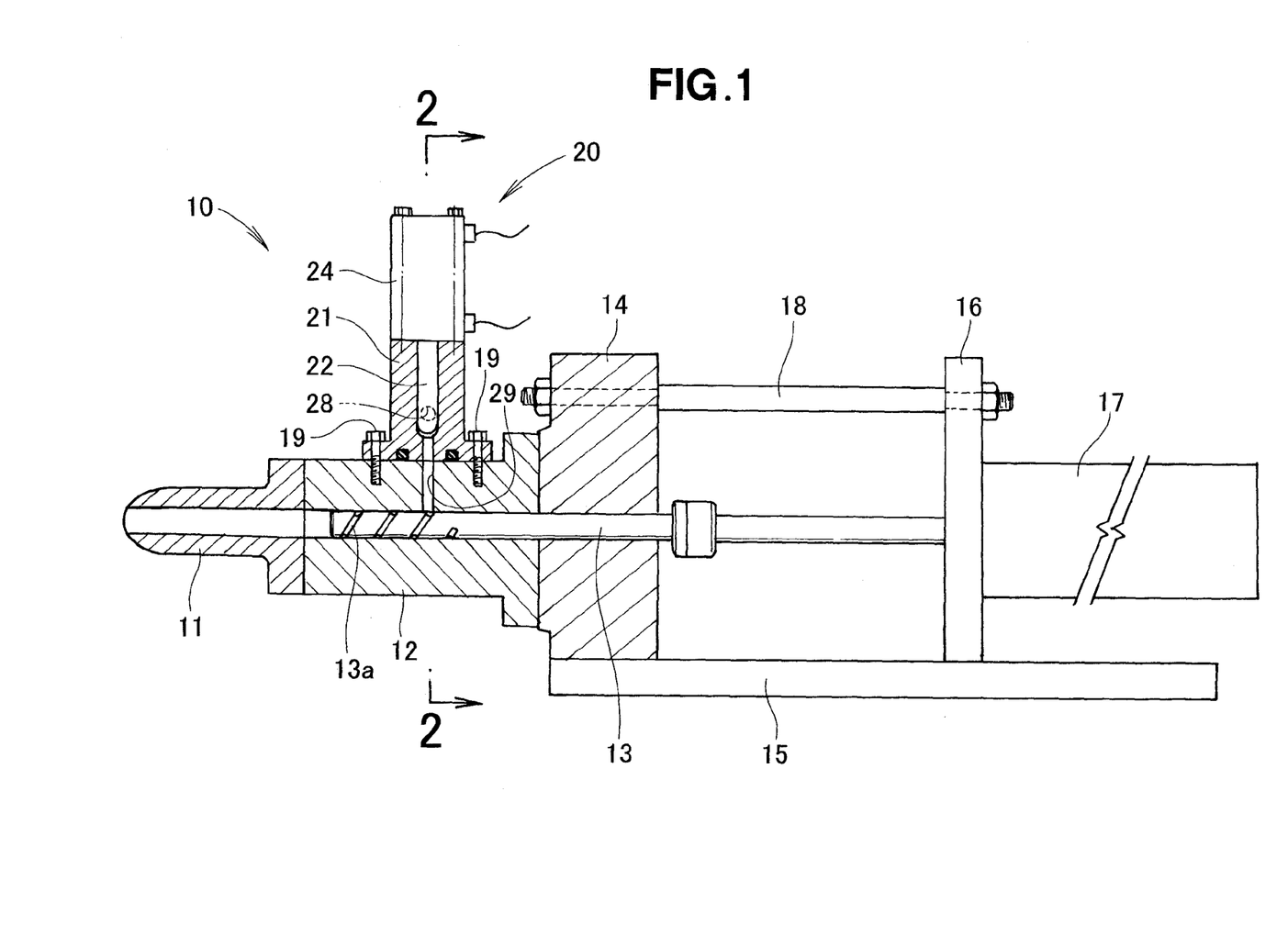
FIG. 1 is a side elevation view of an injecting machine for two different liquid materials according to an embodiment of the present invention.

As shown in FIG. 1, an injecting machine 10 for two different liquid materials includes an injection cylinder 12 having a nozzle 11 disposed on a distal end thereof, a bar-shaped plunger 13 axially movably received in the injection cylinder 12, a support plate 14 supporting a proximal portion of the injection cylinder 12, and a base 15 supporting the support plate 14. The injecting machine 10 further includes a cylinder support plate 16 attached to the base 15 and disposed in parallel to the support plate 14, and a plunger moving means 17 supported on the cylinder support plate 16 for reciprocating the plunger 13 between an advanced position and a retracted position. The injecting machine 10 also includes a mixing mechanism 20 attached to a top surface of the injection cylinder 12.

The plunger 13 has a helical groove 13a formed on a front portion thereof. The support plate 14 and the cylinder support plate 16 have their upper portions connected together by means of a tie rod 18 to prevent sway of the support plate 14 and the cylinder support plate 16. The plunger moving means 17 is preferably a hydraulic cylinder, an air cylinder or an electric cylinder.

Figure 2:
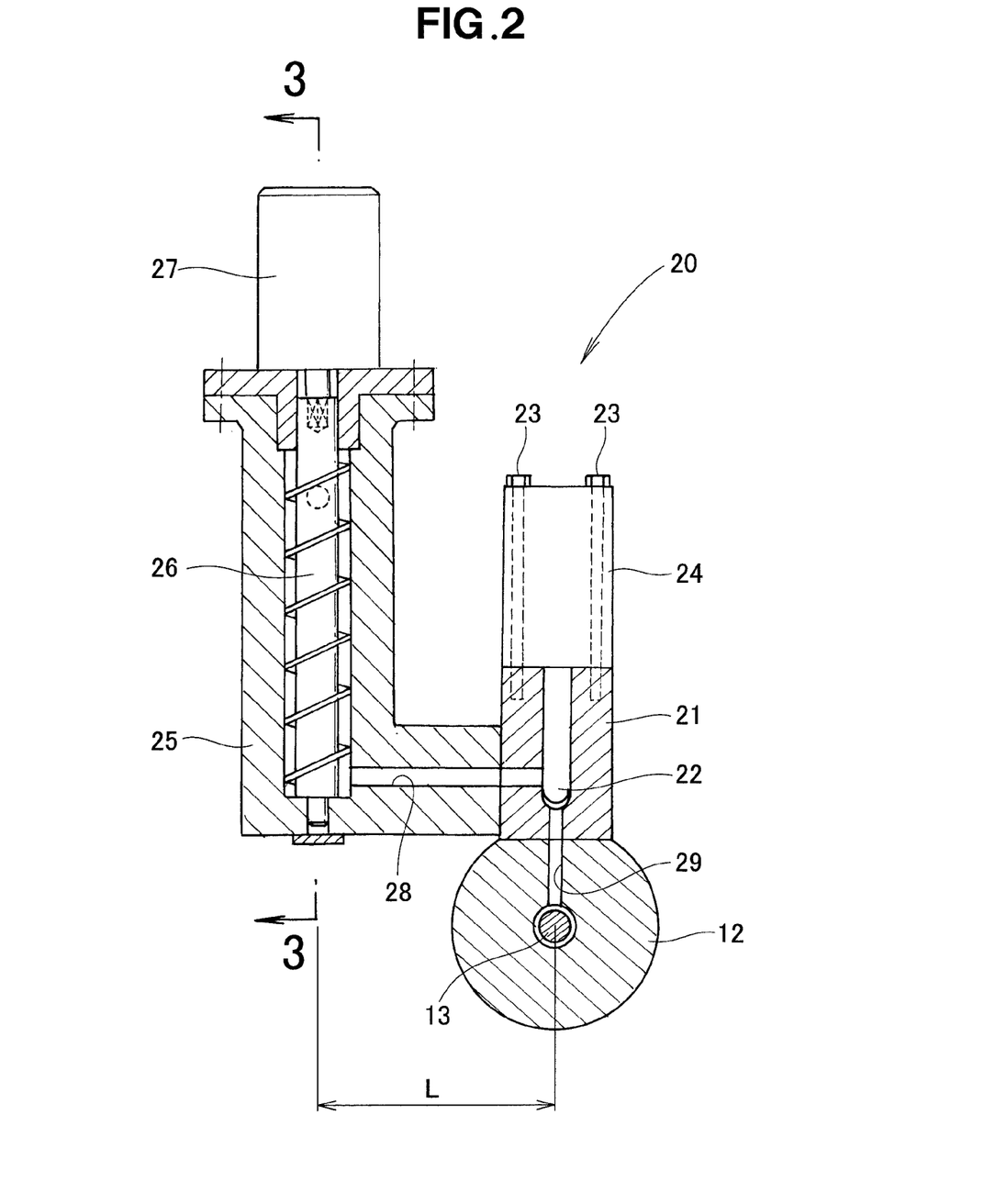
FIG. 2 is a cross-sectional view taken along line 2-2 of FIG. 1.

As shown in FIG. 2, the mixing mechanism 20 includes a valve casing 21 mounted on the top surface of the injection cylinder 12 and fixed to the injection cylinder 12 by a plurality of bolts 19 (FIG. 1), a valve member or element 22 vertically movably received in the valve casing 21, and a valve actuator 24 secured to a top of the valve casing 21 by means of bolts 23, 23 for moving the valve element 22 vertically. The mixing mechanism 20 further includes a mixing block 25 attached to a lateral side of the valve casing 21, a screw 26 rotatably received in the mixing block 25, and a screw rotating mechanism 27 attached to one end of the mixing block 25 for rotating the screw 26. The screw rotating mechanism 27 is preferably an electric motor having a speed reducer.

A horizontal first passage 28 is formed in the mixing block 25 and extends into the valve casing 21. A second passage 29 extends vertically downwardly from a distal end of the first passage 28 out of the valve casing 21 and into the injection cylinder 12. When driven by the valve actuator 24 to move downwardly to a closed position, the valve element 22 closes the second passage 29. When driven by the valve actuator 24 to move upwardly to an open position, the valve element 22 brings the second passage 29 into fluid communication with the first passage 28.

Figure 3:
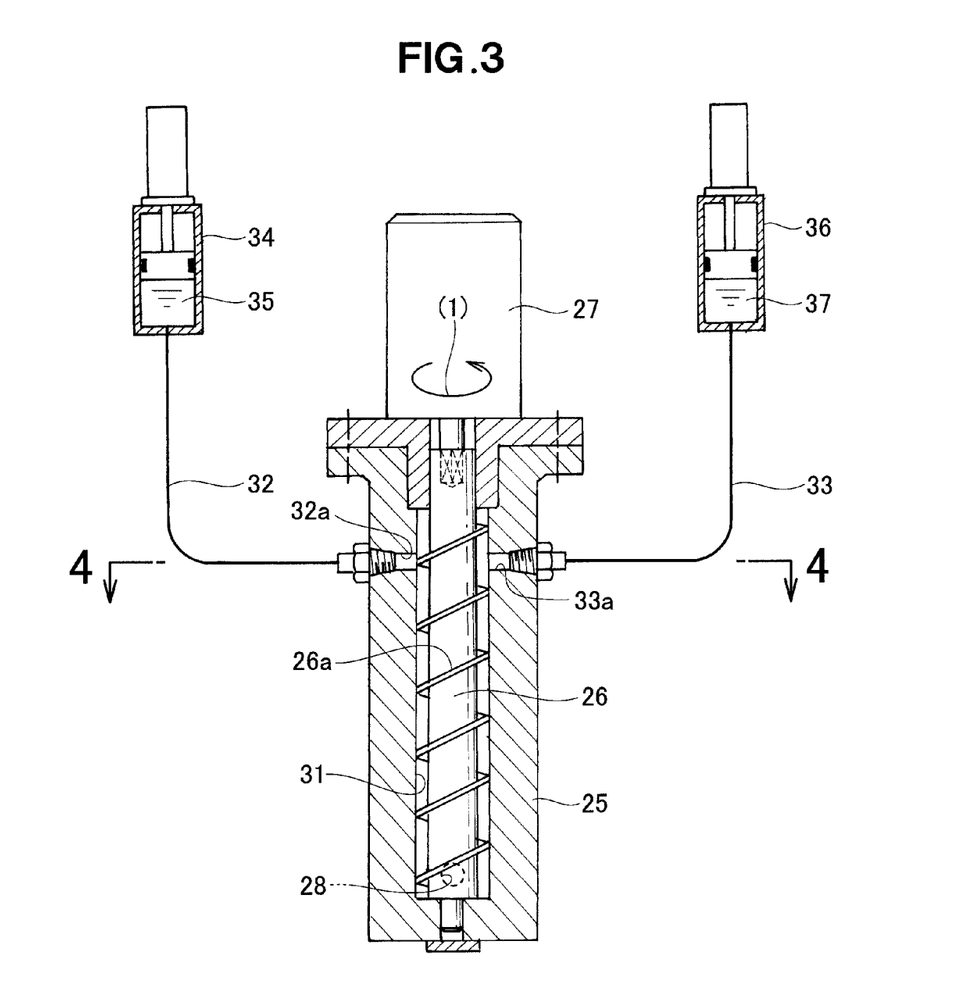
FIG. 3 is a cross-sectional view taken along line 3-3 of FIG. 2.

As shown in FIG. 3, the screw 26 includes a helical blade 26a and is accommodated in a mixing chamber 31 formed within the mixing block 25. The mixing chamber 31 has a lower portion communicating with the first passage 28. The mixing chamber 31 has an upper portion communicating with first and second liquid supply passages 32, 33. The first liquid supply passage 32 is adapted to deliver a first liquid or first liquid material 35, which has been forced out of a first cylinder 34, to the mixing chamber 31. The second liquid supply passage 33 is adapted to deliver a second liquid or second liquid material 37, which has been forced out of a second cylinder 36, to the mixing chamber 31. The first liquid supply passage 32 has a first connection port 32a communicating with the upper portion of the mixing chamber 31, and the second liquid supply passage 33 has a second connection port 33a communicating with the upper portion of the mixing chamber 31.

Figure 4:
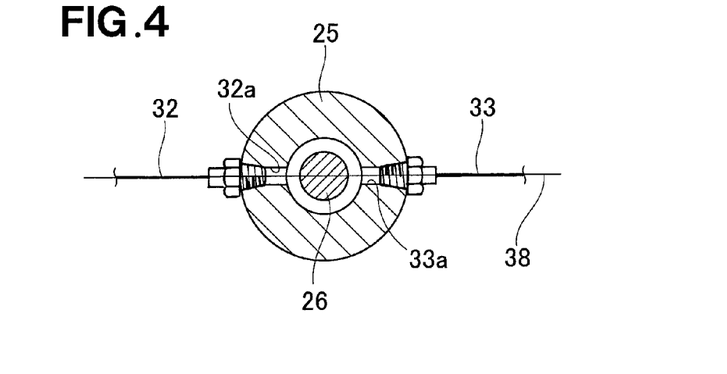
FIG. 4 is a cross-sectional view taken along line 4-4 of FIG. 3.

As shown in FIG. 4, the first connection port 32a of the first liquid supply passage 32 and the second connection port 33a of the second liquid supply passage 33 are arranged on a line 38 passing through an axis of rotation of the screw 26, and the screw 26 is interposed between the first connection port 32a and the second connection port 33a. The first and second connection ports 32a, 33a are diametrically opposite to one another and, hence, these connection ports 32a, 33a can be formed by performing a drilling operation once on the mixing block 25.

In FIG. 3, the screw rotating mechanism 27 rotates the screw 26 at a low speed, preferably, in a reverse direction as shown by an arrow (1). During the rotation of the screw 26, the first liquid 35 is delivered from the first liquid supply passage 32 into the mixing chamber 31 while the second liquid 37 is delivered from the second liquid supply passage 33 into the mixing chamber 31.

Since the screw 26 is positioned centrally of the mixing block 25, as shown in FIG. 4, the first and second liquids 35, 37 each first hit a proximal portion of the screw 26 without mixing together. Thereafter, the first and second liquids 35, 37 each advance or flow down in a helical line along the helical blade 26a. A speed of the advancement (downward flow) of each of the first and second liquids 35, 37 is reduced due to the low speed reverse rotation of the screw 26 as shown by the arrow (1). That is, the first and second liquids 35, 37 are agitated and mixed together by the screw 26 over a long period of time. The reverse rotation of the screw 26 sufficiently mixes the first and second liquids 35, 37 together even where the screw 26 is short.

Figure 5A:
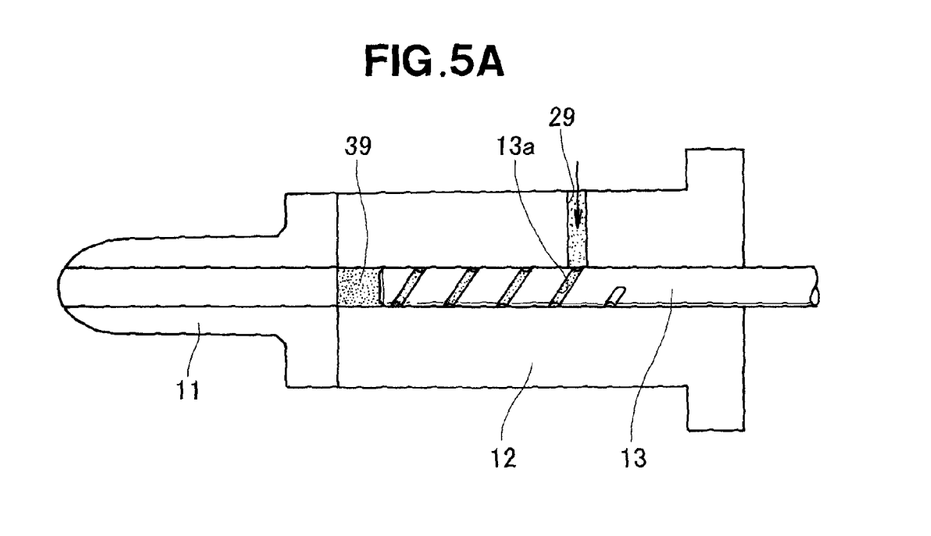
FIG. 5A is a diagrammatical view illustrative of the manner in which a helical groove formed on a plunger of the injecting machine directs a mixture of the two different liquid materials into a forward space formed forwardly of the plunger as the plunger moves back.

A liquid mixture 39 of the first and second liquids 35, 37 passes from the second passage 29 through the helical groove 13a to collect in a forward space formed forwardly of the front portion of the plunger 13, as shown in FIG. 5A, as the plunger 13 gradually moves back.

The first liquid 35 is, for example, a curing agent (liquid silicone rubber) and the second liquid 37 is, for example, a base agent (liquid silicone rubber). After the second liquid 37 is mixed into the first liquid 35, the mixture of the first and second liquids 35, 37 changes in quality (physical property) as time elapses.

Figure 5B:
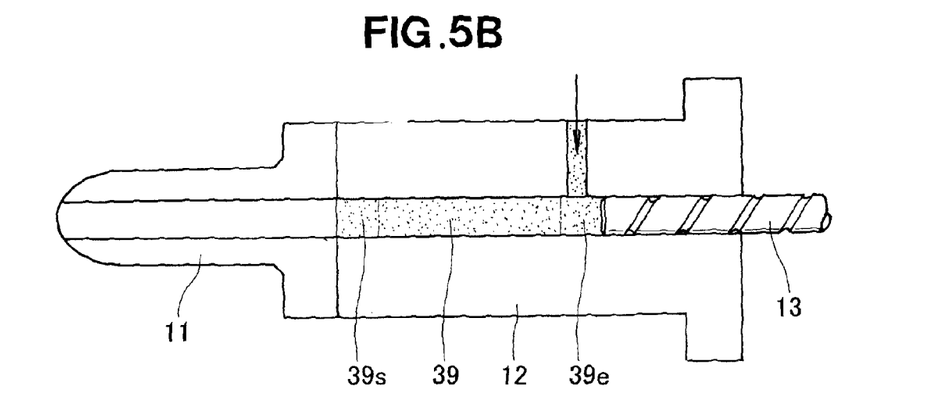
FIG. 5B is a diagrammatical view showing the manner in which the mixture fills up the forward space with the plunger in a retracted position.

When the plunger moves back to a fully retracted position, as shown in FIG. 5B, a first part 39s of the mixture 39, which has first entered the forward space formed forwardly of the front portion of the plunger 13, remains in a front portion of the forward space while a last part 39e of the mixture 39, which has finally entered the forward space, remains in a rear portion of the forward space (the rear portion being closest to the front portion of the plunger 13). As the plunger 13 moves toward the advanced position, the first part 39s of the mixture 39 is first injected out of the nozzle 11, and the last part 39e of the mixture 39 is finally injected out of the nozzle 11. That is, the mixture 39 is injected in a "first-in first-out" manner such that a period of time during which the first part 39s remains in the injection cylinder 12 approximates a period of time during which the last part 39e remains in the injection cylinder 12 to thereby prevent occurrence of difference in quality between the first part 39s and the last part 39e. As a result, it becomes possible to reduce a maintenance time to prevent hardening of the mixture in the production process. In addition, it becomes possible to run the machine 10 continuously for an increased period of time so as to improve the productivity.

The relative position (distance) between the nozzle 11 (FIG. 1) and the injection cylinder 12 and the relative position between the injection cylinder 12 and the support plate 14 are variable due to a change in ambient temperature. If the mixing mechanism 20 is mounted either in such a manner as to bridge the nozzle 11 and the injection cylinder 12, or alternately in such a manner to bridge the injection cylinder 12 and the support plate 14, leakage of a liquid mixture may occur at joint portions and mating portions in the mixing mechanism 20 due to a change in relative position: According to the present invention, the entirety of the mixing mechanism 20 is mounted on the injection cylinder and the aforesaid change in the relative position does not take place. The mixing mechanism 20 is therefore completely free from a liquid-material leakage problem.

Referring back to FIG. 2, the first passage extends perpendicularly to the plunger 13, and the mixing block 25, the screw 26 and the screw rotating mechanism 27 are spaced a distance L away from the plunger 13. As a result, a couple of force (moment) directed in a counterclockwise direction in this figure is produced about the plunger 13. This moment acts as a twisting force on the injection cylinder 12. Where the mixing block 25, the screw 26 and the screw rotating mechanism 27 are made large in size, the moment increases and affects the injection cylinder 12.

It is preferable that no moment (couple of force) is produced in the machine. Discussion is made below as to an injecting machine modified to produce no moment discussed above.

Figure 6:
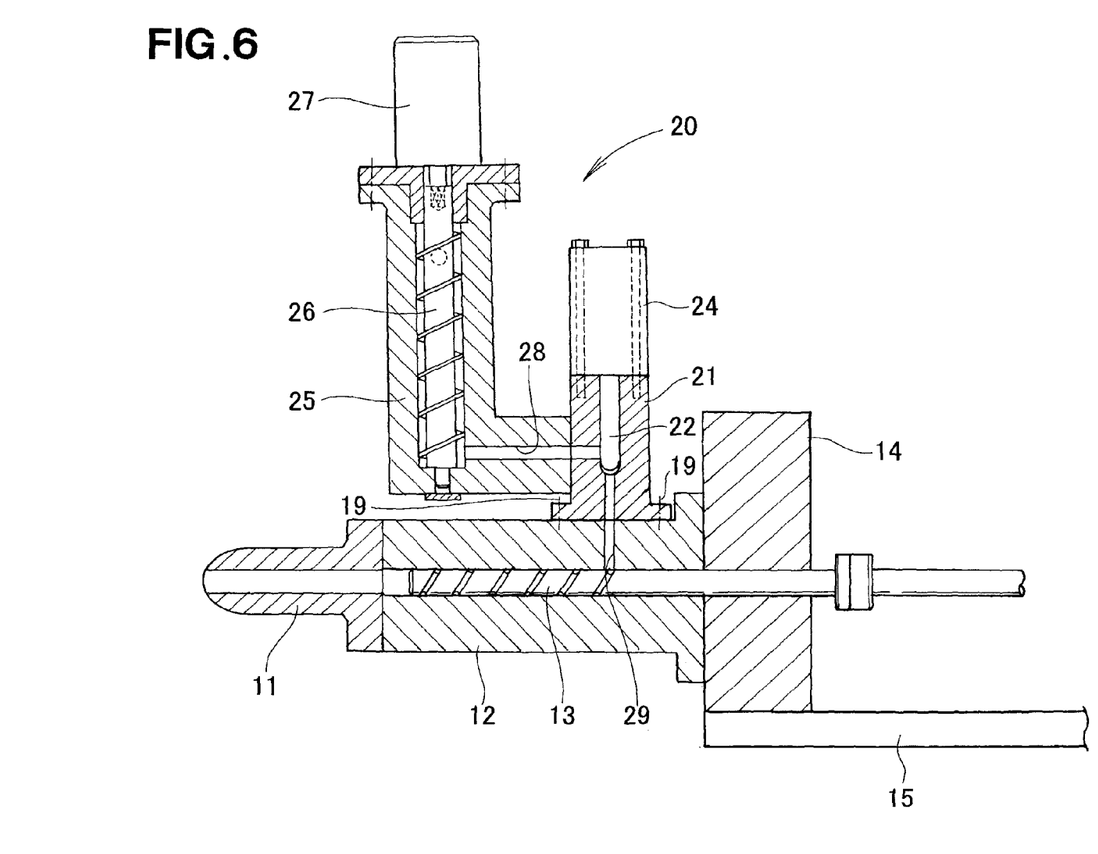
FIG. 6 is a view showing a modification to the injecting machine shown in FIG. 1.

As shown in FIG. 6, the first passage 28 extends in parallel to the plunger 13. That is, the valve casing 21 and the mixing block 25 are arranged in a direction along an axis of the injection cylinder 12. This arrangement eliminates concern over generation of a couple of force (moment) which acts on the injection cylinder 12. Other parts of the modified injecting machine shown in FIG. 6 are the same as those of the injecting machine 10 and hence their discussions can be omitted.

Referring back to FIG. 2, it is to be noted that the injection cylinder 12 is subjected to a couple of force (moment) produced due to the first passage 28 extending perpendicularly to the axis of the injection cylinder 12, however, this arrangement allows the use of an injection cylinder with a reduced length.

The screw 26 shown in FIG. 6 may be disposed horizontally. In such instance, however, the screw rotating mechanism 27 may interfere with a non-illustrated anchoring plate, and to avoid the occurrence of this problem, the injection cylinder 12 should be extended further in a forward direction. In the arrangement shown in FIG. 6, the plunger 13 is disposed horizontally and the screw 26 is disposed vertically. The screw rotating mechanism 27 located at a top end of the mixing mechanism 20 does not require a separate anchoring plate, and the overall length of the injection cylinder 12 can be reduced.

Among those components which constitute the mixing mechanism 20, only the valve casing 21 is firmly connected to the injection cylinder 12 by the bolts 19, 19. The valve actuator 24, the mixing block 25, and the screw rotating mechanism 27 are held out of direct contact with the injection cylinder 12. Even when the injection cylinder 12 is caused to expand or contract due to a change in temperature, the heat expansion/contraction of the injection cylinder 12 gives no substantial effect on the mixing mechanism 20. Thus, a liquid-material leakage problem is uneasy to occur in the mixing mechanism 20.

Figure 7:
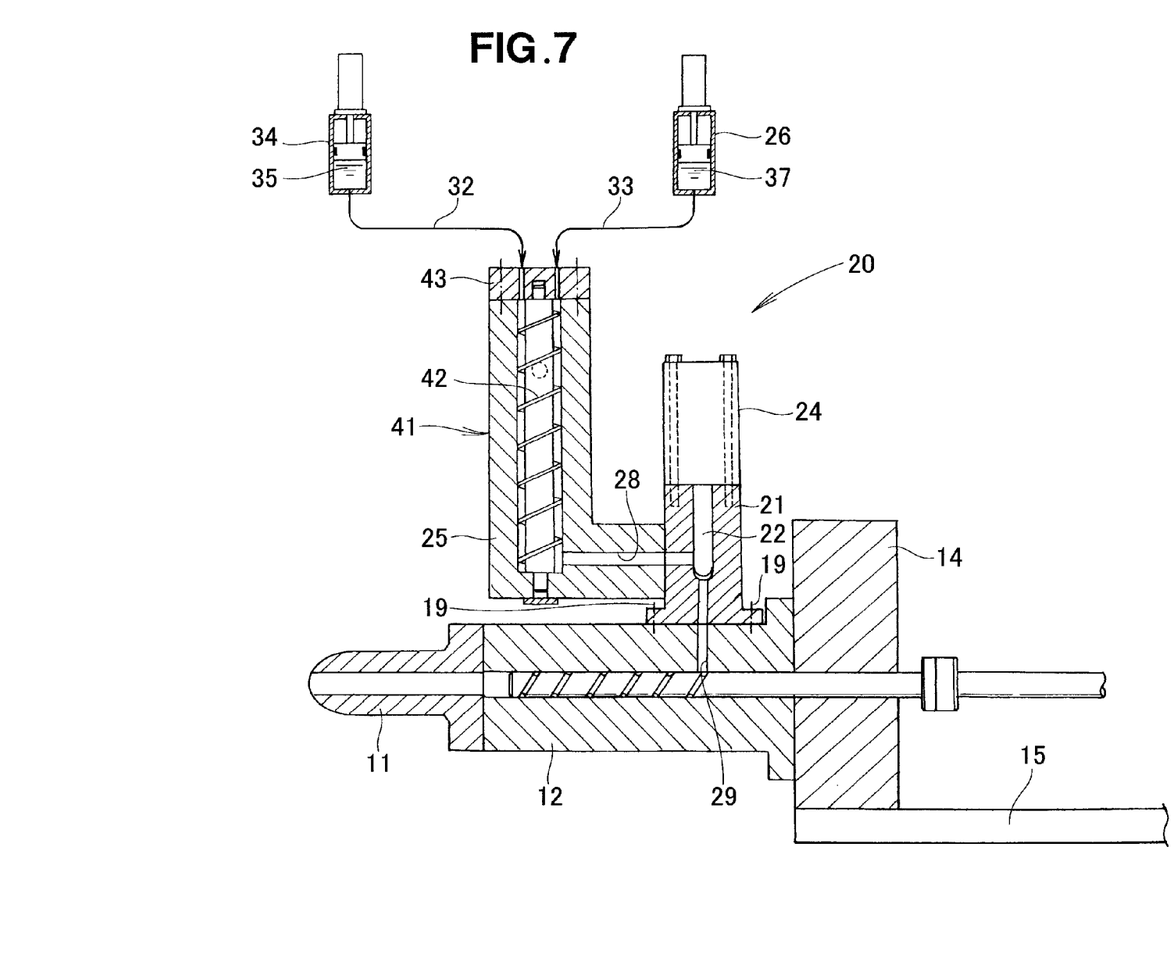
FIG. 7 is a view showing a further modification to the injecting machine shown in FIG. 1.

Discussion is made below as to a further modification to the injecting machine. As shown in FIG. 7, the mixing mechanism 20 may include a static mixer 41. The static mixer 41 includes the mixing block 25, a stationary (non-rotatable) mixer element 42, and an end plate 43 disposed on one end of the mixer element 42 for introducing the first and second liquids 35, 37 into the mixing block 25. The mixer element 42 is preferably a leftward or rightward twisted plate.

The first liquid 35 is forced from the first cylinder 34 through the end plate 43 into the mixing block 25. Concurrently, the second liquid 37 is forced from the second cylinder 36 through the end plate 43 into the mixing block 25.

The first and second liquids 35, 37 are agitated and mixed together repeating a flow division, a rotational circulation and a flow reversal as the liquids 35, 37 flow along the mixer element 42. Since the static mixer 41 does not require the screw rotating mechanism 27 (FIG. 3), the mixing mechanism 20 is simple and cheap.

The injecting machine of the present invention is well suited for mixing and injecting first and second liquids of different properties.

Obviously, various minor changes and modifications of the present invention are possible in the light of the above teaching. It is therefore to be understood that within the scope of the appended claims the invention may be practiced otherwise than as specifically described.

What is claimed is:

1. An injecting machine for two different liquid materials, comprising:

an injection cylinder having a nozzle disposed on a distal end thereof;

a plunger defining a longitudinal axis reciprocally received in the injection cylinder for undergoing reciprocating movement between an advanced position and a retracted position, the plunger injecting a liquid mixture of the two different liquid materials as the plunger moves to the advanced position;

plunger moving means for causing the plunger to reciprocate between the advanced position and the retracted position; and a mixing mechanism disposed on the injection cylinder for mixing the two different liquid materials together to provide the liquid mixture and to feed the liquid mixture into the injection cylinder, the mixing mechanism having a mixing block with a mixer therein, a first liquid supply passage disposed at a first portion of the mixing block for supplying one of the first two liquid materials as a first liquid material, and a second liquid supply passage disposed at a second portion of the mixing block separate from the first portion for supplying the other of the two liquid materials as a second liquid material, a first passage formed in the mixing block for causing the liquid mixture to flow out of a vicinity of a distal end of the mixer, and a valve casing connected to the mixing block and configured to receive the liquid mixture through the first passage, the mixer being disposed to extend generally vertically and being laterally spaced from the valve casing, and the valve casing being connected to the injection cylinder so that the mixing mechanism is supported in its entirety by the injection cylinder.

2. The injecting machine of claim 1, wherein the mixing mechanism comprises:

the mixer including a screw rotatably accommodated in the mixing block, the first liquid supply passage being disposed at the first portion of the mixing block for supplying the first liquid material to a proximal portion of the screw, and the second liquid supply passage being disposed at the second portion of the mixing block for supplying the second liquid material to the proximal portion of the screw;

a screw rotating mechanism supported on the mixing block for rotating the screw;

a valve element movably received in the valve casing and disposed parallel to the screw; and a valve actuator mounted to the valve casing for moving the valve element.

3. The injecting machine of claim 2, wherein the axis of the plunger is disposed to extend horizontally.

4. The injecting machine of claim 3, wherein the first passage extends perpendicularly to a plane containing the axis of the plunger.

5. The injecting machine of claim 3, wherein the first passage extends in parallel to the axis of the plunger.

6. The injecting machine of claim 2, wherein the first passage extends perpendicularly to a plane containing the axis of to the plunger.

7. The injecting machine of claim 2, wherein the first passage extends in parallel to the axis of the plunger.

* * * * *